Patented Nov. 18, 1952

2,618,529

UNITED STATES PATENT OFFICE 2,618,529

APPLICATION OF LEUCO ESTERS OF VAT DYESTUFFS ON ANIMAL FIBERS USING UREA AND AN ACID

Hans Luttringhaus, Chatham, and James E. Flint, Glen Ridge, N. J., and Alex A. Arcus, Bellerose, N. Y., assignors to General Dyestuff Corporation, New York, N. Y., a corporation of New York No Drawing. Application December 31, 1949, Serial No. 136,405

19 Claims. (Cl. 8—35)

This invention relates to an improvement in the production of colorations on animal fibers, especially wool, and on textile materials made of such fibers, by means of the sulfuric ester salts of leuco vat dyes.

More particularly, the invention relates to an improved process and composition for bichromate development of leuco vat dye sulfuric ester salts on animal fibers, especially wool.

In addition, the invention relates to improved dyestuff compositions for the production of colorations, particularly including heavy shades, with leuco vat dye sulfuric ester salts on wool and other animal fibers, which shades are fast to fulling, washing, potting, perspiration and light, and also to the method of applying such compositions to animal fibers for the production of such colorations, especially in continuous dyeing and printing.

It was known heretofore to pad or print animal fibers, especially wool, with sulfuric ester salts of leuco vat dyes in combination with reagents (especially salts) adapted to liberate acids on steaming, the dyestuff being fixed on the fiber by steaming and subsequently developed by acid oxidation. It was also proposed to include oxidizing agents together with vat dye leuco ester salts, as applied to the material to be colored, followed by treatment rendering the oxidizing agent effective to cause development of the coloration in a single step. Excessively long steaming was required in the first method to fix the dyestuffs on animal fibers with acid liberating materials, so that it was impractical to apply such methods for continuous dyeing or printing. The inclusion of additional ingredients such as acid-splitting salts and oxidizing agents reduced the concentration of the vat dye leuco ester salts which could be retained in solution in the aqueous mixture. As a result, attempts to dye or print wool and other animal fibers in heavy shades with leuco vat dye sulfuric ester salts were without success because of the limited solubility of the ester salts, which was further decreased by inclusion of acid-splitting salts necessary to fix the leuco esters on the textile material.

A further difficulty in the continuous application of leuco vat dye sulfuric ester salts for production of deep shades on animal fibers resided in the fact that concentrated solutions thereof precipitate and oxidize rapidly in acid medium, particularly during storage or use of concentrated padding solutions and printing pastes. In most cases, the colorations were not adequately fixed on the material, resulting in bleeding of the dyestuff in the developing bath and onto white wool, so that the process was unsuitable for printing, and the final colorations were defective in fastness to washing, fulling, potting and perspiration.

It is an object of this invention to provide improved aqueous leuco vat dye sulfuric ester salt compositions, suitable for padding and printing wool and other animal fibers, and adapted for the production of heavy shades thereon, such compositions even containing up to 20% of the leuco vat dye sulfuric ester salt, being stable to oxidation and precipitation during use and storage, and yielding shades, fast to fulling, washing, potting, perspiration and light, and not subject to bleeding during developing or further processing.

Another object is to provide a process for application of said compositions wherein fixation of the dyestuff can be effected by steaming for a few minutes, and development can be effected by brief immersion in an oxidizing bath, so that the process is especially adapted for continuous printing and padding operations.

In the production of colorations on animal fiber with leuco vat dye sulfuric esters, it was known to develop the coloration by treatment of the material, after fixation of the dyestuff, with an acid oxidizing bath containing a bichromate and a sulfuric acid, advantageously with addition of ammonium thiocyanate. However, in the case of leuco ester salts of some vat dyestuffs, notably of indigo, such development was unsuitable because it resulted in over-oxidation, leading to impairment of the shade and fastness properties. In the case of the sulfuric ester salt of leuco indigo, it was therefore customary to employ sodium nitrite and sulfuric acid for development of the coloration. Other leuco ester salts, however, such as those of tetrabromoindigo, can not be developed by means of sodium nitrite and sulfuric acid on animal fibers. Such differences in susceptibility to over-oxidation and to development with the same oxidizing agent prevented the use of combinations of various leuco ester salts of vat dyes, otherwise suitable for producing desired shades on wool and other animal fibers.

It is an object of this invention to provide a process and composition for the development of leuco sulfuric ester salts of vat dyestuffs on wool and other animal fibers, employing a bichromate as the oxidizing agent, whereby all of the ester salts can be satisfactorily developed, thus enabling the joint use of any of the leuco ester salts for coloration of animal fiber with a single development bath.

We have discovered that stable solutions suitable for padding or printing animal fibers, of vat dye leuco sulfuric ester salts containing up to 20% (e. g. 10 to 20%) of these dyestuffs, can be prepared by compounding an aqueous padding solution or printing paste to contain, as the solubilizing agent, urea in a concentration of the order of 10% or more (e. g. 10 to 20%), together with 0.3 to 5% of a free acid such as phosphoric, sulfamic, lactic, citric, or tartaric acid and the like, which yields a pH of 1 to 3 in water within the aforesaid concentration range, the composition being otherwise substantially free of strong electrolytes. The compositions can contain, in addition, a suitable amount (e. g. 1 to 3%) of a thickening agent, and/or a small amount (0.25 to 2%) of a wetting agent, especially an organic sulfonate of high molecular weight. We have found that urea in the aforesaid concentrations, in the presence of a free acid but in the absence of substantial amounts of other strong electrolytes, such as inorganic salts or salts of low molecular weight organic acids, exerts an unusual solubilizing and antioxidant effect on leuco vat dye sulfuric ester salts, so that stable aqueous solutions are formed, not subject to precipitation or oxidation during use or on storage for several days at a time. The resulting compositions can be applied to wool or other animal fiber by padding, or by Vigoureux or other printing, and fixed on the fiber by steaming for only a few (e. g. 4 to 6) minutes.

The colorations thus produced can be developed by immersing the material in an acid oxidizing bath, e. g. an acid bichromate bath, at elevated temperatures, e. g. 180 to 212° F. At higher temperatures within this range, e. g. 200 to 212° F., development can be rapidly completed (e. g. in 0.5 to 3 minutes). Contrary to previous experience with the production of heavy shades on animal fibers with leuco vat dye sulfuric ester salts, colorations produced with the compositions of this invention do not bleed into the developing bath nor onto white wool. Hence, the padding compositions can be used for Vigoureux printing of slubbing, whereby fastness to fulling and washing is obtained which heretofore could only be approached with chrome dyes and protracted steaming (e. g. 3 to 5 hours). Moreover, fastness to potting of Vigoureux printed slubbing, produced in accordance with this invention, is obtained in the case of a large variety of shades which could not be produced fast to potting in any other way heretofore known.

We have further discovered that a bichromate developing bath in which sulfuric acid, normally employed, is replaced by an equal amount of ortho-phosphoric acid, effects development rapidly and fully of any leuco vat dye sulfuric ester salt on animal fibers, without over-oxidation, yielding shades of excellent fastness properties. Because of the rapidity of development, the bichromate phosphoric acid baths of the invention are especially adapted for development in continuous padding or printing operations. The use of phosphoric acid in the development bath eliminates the problem of corrosion of stainless steel or other steel equipment, which is normally a serious disadvantage of sulfuric acid in bichromate development, and largely avoids the hazards involved in handling sulfuric acid, particularly of injuries to operators and their apparel.

The novel development process of this invention is of especial interest in the production of colorations on animal fibers with the leuco vat dye sulfuric ester salt compositions discussed above, especially navy blue shades, for which it is desired from the standpoint of economy to use a relatively cheap dyestuff such as the sulfuric ester salt of leuco indigo, together with another dyestuff such as the sulfuric ester salt of leuco tetrabromoindigo, to correct the excessive red appearance in artificial light of colorations produced with leuco tetrabrominated indigo sulfuric ester salts alone, such combinations yielding navy blue shades of high quality which can otherwise be obtained only with relatively costly leuco ester salts, such as that of hexabromoindigo, which is not as fast to light as indigo.

We have further observed that the use of phosphoric acid with a bichromate in the development bath may produce a yellowish-green discoloration on wool or other animal fiber, which is sometimes objectionable, especially in the production of bright blue shades. While this discoloration can be removed by after-treatment with sulfuric acid or oxalic acid, such removal is relatively uneconomical because of the added processing step involved. We have discovered, however, that the aforesaid discoloration can be prevented by an inclusion in the development bath of a relatively large amount (e. g. 5 to 10%) of sodium chloride, or by after-treatment with an aqueous solution of sodium chloride.

The following examples illustrate the development baths, padding and printing compositions, and procedures of our invention, and their application for the coloration of wool fibers. Parts are by weight.

*Example 1*

A padding solution is prepared, having the following composition:

1.0 part of the sulfuric ester sodium salt of leuco 4,4'-dimethyl-6,6'-dichlorothioindigo 8.0 parts of the sodium sulfuric ester salt of leuco 4,4',7,7'-tetrabromoindigo 8.0 parts of the sulfuric ester sodium salt of leuco hexabromoindigo 10.0 parts urea 1.5 parts gum tragacanth 1.0 part sodium sulfo-trihexyl-tricarballylate 0.5 part 85% aqueous ortho-phosphoric acid 70.0 parts water The resulting solution is stable to formation of precipitates and resists oxidation when held for several days. Urea contained therein acts, even in the presence of the free phosphoric acid as a solubilizing agent and anti-oxidant, despite the fact that it is ineffective to solubilize the vat dye sulfuric ester salts, in the presence of strong electrolytes such as the acid-liberating salts commonly employed in such compositions. The padding liquor is padded on wool (e. g. in the form of piece goods) at room temperature, and fixed on the material by steaming for 4 to 6 minutes. The material is then passed through an aqueous developing bath containing 2 parts of $H_3PO_4$ and 0.3 part of sodium bichromate per 100 parts of solution, the bath being maintained at 200 to 212° F. Development is effected in 1 minute, yielding a deep navy blue shade which is fast to fulling, washing, potting, perspiration and light. If an objectionable greenish-yellow discoloration appears, it can be removed by additional passage of the material through a solution of common salt, or dilute aqueous sulfuric or oxalic acid. Alternatively, the development can be carried out by immersing the material bearing the fixed dyestuff composition in a bath containing 0.3% of sodium bichromate and 2% of $H_2SO_4$ per 100 parts of water, employing similar temperatures and a similar treatment period. In this case, a greenish-yellow discoloration appears from the bichromate alone, which can be removed easily.

*Example 2*

A padding solution is prepared having the following composition:

10.0 parts of the sodium sulfuric ester salt of leuco 5-bromoindol-8'-chloro-1',2'-naphthiopheneindigo
10.0 parts urea
1.5 parts gum tragacanth
0.5 part $H_3PO_4$
1.0 part sodium sulfo-trihexyl-tricarballylate
77.0 parts water The resulting solution is printed on slubbing on a Vigoureux machine, and the printed fiber steamed for 4 minutes. Coloration is developed by immersion of goods for 45 seconds to 2 minutes, in an aqueous developing bath containing 2% $H_2SO_4$ and 0.3% of sodium bichromate, at a temperature of 200 to 212° F. Dark gray to black shades are obtained, having the desirable fastness properties mentioned in the preceding example.

*Example 3*

A printing paste is prepared having the following composition:

12.0 parts of the sodium sulfuric ester salt of leuco 2,1-naphthioindigo
10.0 parts urea
2.4 parts gum tragacanth
0.5 part $H_3PO_4$
75.1 parts water The resulting paste is printed on chlorinated wool challis in any desired design, and steamed for 5 minutes in an ager. The printed material is developed, as in the preceding example, by passage through an aqueous developing bath at 200 to 212° F. for 45 seconds to 2 minutes, said bath containing 2% sulfuric acid and 0.3% sodium bichromate. A deep brown shade is obtained, having the excellent fastness properties noted in the preceding examples.

The leuco ester compositions of the foregoing examples can be satisfactorily developed by the sulfuric or phosphoric acid-bichromate method, whether padded or printed on piece goods, slubbing or yarn. The time required for development can be accelerated (e. g. within the disclosed range) by agitation of the bath relative to the material. Any motion of the bath relative to the goods constitutes such agitation, as, for example, squeezing the goods while in the developing bath, leading the material over a suction slot to force the liquid through the material, or by leading the material (especially slubbing) through a vibrating trough with concurrent circulation of the liquid.

*Example 4*

A padding liquor is prepared, having the following composition:

5.0 parts of the sodium sulfuric ester salt of leuco 4,4'-dimethyl-6,6'-dichlorothioindigo
5.0 parts of the sodium sulfuric ester salt of leuco dibenzopyrenequinone
10.0 parts urea
1.5 parts gum tragacanth
1.0 part of sodium sulfo-trihexyl-tricarballylate
3.0 parts acetic acid
74.5 parts water The resulting solution is stable for more than a week at room temperature, forming no precipitate and undergoing no oxidation. The solution can be padded on wool in any form, and fixed by steaming for 4 to 6 minutes. When used for Vigoureux printing of slubbing, the coloration does not bleed in the development bath nor onto white wool. Development can be effected by the phosphoric or sulfuric acid-bichromate treatment disclosed in the preceding examples. Deep orange shades are produced which are fast to potting, fulling, and washing, as well as perspiration and light.

*Example 5*

A padding liquor is prepared, having the following composition:

6.0 parts of the sodium sulfuric ester salt of leuco indigo
6.0 parts of the sodium sulfuric ester salt of leuco 5,5',7,7'-tetrabromoindigo
1.5 parts gum tragacanth
1.0 part of sodium sulfo-trihexyl-tricarballylate
0.5 part $H_3PO_4$
75.0 parts water
Urea used in an amount yielding a concentration of 10% in the total composition.

The solution is padded on wool, steamed for 5 minutes, and developed by passage for 1 minute through a developing bath at 200 to 212°F., containing 2 parts of $H_3PO_4$, 0.3 part of sodium bichromate and 8 parts of sodium chloride per 100 parts of aqueous solution. A dark navy blue shade is produced, having no yellowish-green discoloration from the bichromate-$H_3PO_4$ acid mixture. The coloration has a brilliance and depth similar to that produced in Example 1, and exhibits no undesirable red appearance in artificial light. The cost of the dyestuffs employed, however, is about one-third of the cost of the dyestuffs employed in Example 1.

In preparing the concentrated aqueous padding and printing compositions in accordance with the invention, the proportion of leuco vat dye sulfuric ester salts in the composition can be as high as 20%, e. g. between 10 and 20%. Urea is employed in proportions of the order of 10%, although amounts up to 20% or more can be used. The acid employed in conjunction with urea is preferably one having no reducing or oxidizing action on the dyestuff, and preferably nonvolatile under conditions of use, e. g. phosphoric, sulfamic, lactic, oxalic, tartaric, or citric acids, and is employed in a concentration yielding a pH of 1 to 3 in water, and within the range of 0.3 to 5% in the composition. As discussed above and illustrated in the examples, a suitable amount, e. g. 1 to 3%, of a thickening agent such as gum tragacanth can be employed, if desired. Similarly, a wetting agent, effective in acid solution, particularly a high molecular weight organic sulfonate (e. g. sulfo-tricarballylic acid esters of higher alcohols, sulfo-succinic acid esters such as dioctyl sulfo-succinate, alkyl naphthalene sulfonates and the like) can likewise be added, advantageously in amounts of the order of 0.25 to 2%, especially in the case of padding compositions, to insure thorough penetration of the textile material by the composition. Since the dyestuffs remain dissolved therein, the compositions of the invention can be conveniently applied, even at room temperature, which is especially desirable when mixtures of different dyestuffs are used, so as to avoid selective exhaust of one of the dyestuff components. The dyestuffs contained in the compositions can be fixed on the material by steaming for only 4 to 6 minutes.

The compositions can be applied to animal fibers in the form of slubbing, yarn or piece goods, by padding as well as by Vigoureux or other printing, and the coloration developed, after steaming, by immersion in an acid oxidizing bath, especially an acid bichromate development bath of the type disclosed in the examples. No bleeding occurs in the bath, and white portions of the wool are not stained. The same is true when the colorations are developed more slowly, e. g. by treatment at 180 to 195°F. in an aqueous bath containing 1% of sulfuric or phosphoric acid and sodium bichromate in an amount corresponding to 0.5 to 2.5% of the weight of the fiber, for periods of 30 minutes or more.

In preparing bichromate-phosphoric acid development baths in accordance with the invention, water-soluble chromates or bichromates can be used instead of sodium bichromate (e. g. chromates or bichromates of ammonium or an alkali metal). For rapid development, of especial interest for continuous processes, the concentration of the chromate or bichromate in the bath can be varied so as to provide a concentration of $CrO_3$ advantageously from 0.1 to 0.5%. The concentration of about 0.2% of $CrO_3$, as illustrated in the examples, is satisfactory. The amount of phosphoric acid employed is such as to provide a pH of about 0.5 to 1.5 and is generally present in amounts corresponding to 0.5 to 3% of the bath, in excess of the amount required to convert the metallic or ammonium cation of the chromate or bichromate to an acid phosphate. Preferably, the solution contains about 1.5% of free phosphoric acid. The amount of sodium chloride added to prevent greenish-yellow discoloration of the material is preferably between 5 and 10% of the developing bath. For rapid development, the temperature of the solution is preferably maintained at or near boiling temperatures, e. g. from 200 to 212°F. The time for development varies to some extent, depending upon the temperature of the developing bath and the agitation of the bath relative to the material. In general, development is complete at the aforesaid temperatures in periods of from 0.5 to 3 minutes. Development can be accelerated by increasing agitation in the manner hereinbefore disclosed.

In view of the extremely short time required for bichromate development in accordance with this invention, the phosphoric acid-bichromate procedure is especially advantageous in continuous dyeing and printing of woolen materials. It is especially adapted for development of mixtures of leuco sulfuric ester salts since all of the dyestuffs are similarly developed by the treatment, and difficulties encountered by reason of varying susceptibility to development or over-oxidation are avoided. The procedure is especially advantageous for the development of heavy shades produced with the concentrated vat dye leuco ester salt printing and padding compositions of the invention, hereinbefore described.

The sulfuric ester salts of any leuco vat dyestuff, or mixtures of different leuco ester salts can be used in the compositions or processes of this invention, as, for example, the sulfuric ester salts of the leuco vat dyestuffs of the indigoid, thioindigoid, benzoquinone, or anthraquinone series, or of more complex condensed polycyclic ketone vat dyes of the carbocyclic or heterocyclic series. In addition to wool, the processes of the invention can also be advantageously employed in the development of colors on other animal fibers such as hair or fur, on modified animal fibers such as chlorinated wool, and on synthetic fibers from animal protein such as coagulated casein fiber.

Variations and modifications which will be obvious to those skilled in the art can be made in the foregoing compositions and procedures without departing from the scope or nature of the invention.

We claim:

1. An aqueous dye composition for printing or padding animal fiber, containing in aqueous solution, up to 20% of a sulfuric ester salt of a leuco vat dyestuff, about 10% of urea, and a free acid in a concentration from 0.3 to 5%, which yields a pH of 1 to 3 in water, said composition containing no substantial amounts of other strong electrolytes.

2. A composition as defined in claim 1, containing, in addition, a thickening agent.

3. A composition as defined in claim 1, containing, in addition, a wetting agent.

4. A printing or padding process for the production of colorations on animal fibers, which comprises impregnating the fiber with an aqueous dye composition containing in aqueous solution up to 20% of a sulfuric ester salt of a leuco vat dyestuff, from about 10 to 20% of urea, and a free acid in a concentration from 0.3 to 5% which yields a pH of 1 to 3 in water, said composition containing no substantial amounts of other strong electrolytes, steaming the impregnated fiber for 4 to 6 minutes, and developing by treatment in an acid oxidizing bath at elevated temperature.

5. A printing or padding process for the production of colorations on animal fibers, which comprises impregnating the fiber with an aqueous dye composition containing in aqueous solution up to 20% of a sulfuric ester salt of a leuco vat dyestuff, from about 10 to 20% of urea, and a free acid in a concentration from 0.3 to 5% which yields a pH of 1 to 3 in water, said composition containing no substantial amounts of other strong electrolytes, steaming the impregnated fiber for 4 to 6 minutes, and developing by treatment with an acid bichromate bath at 200 to 212° F. for 0.5 to 3 minutes.

6. A process as defined in claim 4, in which the dye composition contains, in addition, a thickening agent.

7. A process as defined in claim 4, in which the dye composition contains, in addition, a wetting agent.

8. A printing or padding process for the production of colorations on animal fibers, which comprises impregnating the fiber with an aqueous leuco vat dye sulfuric ester salt composition containing in aqueous solution up to 20% of leuco vat dye sulfuric ester salt and including at least one leuco vat dye sulfuric ester salt which is normally susceptible to overoxidation with aqueous bichromate sulfuric acid solutions, from about 10 to 20% of urea, and a free acid in a concentration from 0.3 to 5% which yields a pH of 1 to 3 in water, said composition containing no substantial amounts of other strong electrolytes, steaming the impregnated fiber for 4 to 6 minutes, and developing by treatment at elevated temperature in an aqueous solution of a bichromate, and free phosphoric acid.

9. A printing or padding process for the production of colorations on animal fibers, which comprises impregnating the fiber with an aqueous leuco vat dye sulfuric ester salt composition containing in aqueous solution up to 20% of leuco vat dye sulfuric ester salt and including at least one leuco vat dye sulfuric ester salt which is normally susceptible to overoxidation with aqueous bichromate sulfuric acid solutions, from about 10 to 20% of urea, and a free acid in a concentration from 0.3 to 5% which yields a pH of 1 to 3 in water, said composition containing no substantial amounts of other strong electrolytes, steaming the impregnated fiber for 4 to 6 minutes, and developing by treatment for 0.5 to 3 minutes in an aqueous bichromate-phosphoric acid bath at a temperature from 200 to 212° F., the amount of bichromate being sufficient to yield a $CrO_3$ concentration of 0.1 to 0.5%, and the amount of phosphoric acid being sufficient to provide a concentration of 0.5 to 3% of free $H_3PO_4$ in the solution.

10. A printing or padding process for the production of colorations on animal fibers, which comprises impregnating the fiber with an aqueous leuco vat dye sulfuric ester salt composition containing in aqueous solution up to 20% of leuco vat dye sulfuric ester salt and including at least one leuco vat dye sulfuric ester salt which is normally susceptible to overoxidation with aqueous bichromate sulfuric acid solutions, from about 10 to 20% of urea, and a free acid in a concentration from 0.3 to 5% which yields a pH of 1 to 3 in water, said composition containing no substantial amounts of other strong electrolytes, steaming the impregnated fiber for 4 to 6 minutes, and developing by treatment at a temperature of 200 to 212° F. for 0.5 to 3 minutes with an aqueous bath containing a bichromate, free ortho-phosphoric acid as the sole acid, and sodium chloride, the amount of bichromate being sufficient to yield a $CrO_3$ concentration of 0.1 to 0.5%, the amount of phosphoric acid being sufficient to provide a concentration of 0.5 to 3% of free $H_3PO_4$, and the amount of sodium chloride being 5 to 10%.

11. A method for the development of sulfuric ester salts of leuco vat dyes on animal fiber, which comprises treating the material, after fixation of the leuco ester salts thereon, with an aqueous bath containing a bichromate as the sole oxidizing agent and free ortho-phosphoric acid as the sole acid, at a temperature of 180 to 212° F.

12. A method as defined in claim 11, wherein the development bath contains 5 to 10% of sodium chloride.

13. A method as defined in claim 11, wherein the amount of bichromate is sufficient to yield a $CrO_3$ concentration of 0.1 to 0.5%, and the amount of phosphoric acid is sufficient to provide a concentration of 0.5 to 3% of free $H_3PO_4$ in the solution, and the material is passed through the bath for a period of 0.5 to 3 minutes.

14. A method for the development of mixtures of sulfuric ester salts of leuco vat dyestuffs on animal fiber, including a leuco ester salt component normally susceptible to over-oxidation with aqueous bichromate sulfuric acid solutions, and another component which is not susceptible to development with acid oxidizing agents suitable for development of the first component, which comprises treating the material after fixation of the leuco sulfuric esters thereon, with an aqueous bath containing bichromate as the sole oxidizing agent, and free orthophosphoric acid as the sole acid at a temperature of 200 to 212° F. for 0.5 to 3 minutes.

15. A method as defined in claim 14, wherein the leuco sulfuric ester components are the sulfuric ester salts of leuco indigo and of leuco tetrabrominated indigo.

16. An aqueous developing bath for development of sulfuric ester salts of leuco vat dyes on animal fiber, said bath being an aqueous solution containing a bichromate as the sole oxidizing agent, and free ortho-phosphoric acid as the sole acid.

17. An aqueous developing bath for development of sulfuric ester salts of leuco vat dyes on animal fiber, said bath being an aqueous solution containing a bichromate as the sole oxidizing agent, free ortho-phosphoric acid as the sole acid, and containing 5 to 10% of sodium chloride.

18. An aqueous developing bath for development of sulfuric ester salts of leuco vat dyes on animal fiber, said bath being an aqueous solution containing a bichromate as the sole oxidizing agent, and free ortho-phosphoric acid as the sole acid, the amount of bichromate being sufficient to yield a $CrO_3$ concentration of 0.1 to 0.5%, and the amount of phosphoric acid being sufficient to provide a concentration of 0.5 to 3% of free $H_3PO_4$ in the solution.

19. An aqueous developing bath for development of sulfuric ester salts of leuco vat dyes on animal fiber, said bath being an aqueous solution containing a bichromate as the sole oxidizing agent, free ortho-phosphoric acid as the sole acid, and sodium chloride, the amount of bichromate being sufficient to yield a $CrO_3$ concentration of 0.1 to 0.5%, and the amount of phosphoric acid being sufficient to yield a concentration of 0.5 to 3% of free $H_3PO_4$, and the amount of sodium chloride being 5 to 10%.

HANS LUTTRINGHAUS.
JAMES E. FLINT.
ALEX A. ARCUS.

REFERENCES CITED

The following references are of record in the file of this patent:

UNITED STATES PATENTS

| Number | Name | Date |
| --- | --- | --- |
| 2,122,113 | Ratti | June 28, 1938 |
| 2,432,041 | Ratti | Dec. 2, 1947 |
| 2,437,554 | Ratti | Mar. 9, 1948 |

FOREIGN PATENTS

| Number | Country | Date |
| --- | --- | --- |
| 267,986 | Great Britain | Aug. 11, 1927 |
| 792,611 | France | Oct. 21, 1935 |

OTHER REFERENCES

American Dyestuff Reporter for July 25, 1949, page 566.

"Chem. Technology of Dyeing and Printing," by L. Diserens, Reinhold Publishing Corporation, New York city, 1948, pages 205, 206.

"Theory and Practice of Wool Dyeing," by C. L. Bird, published by Society of Dyers and Col., London, 1947, page 112.

American Dye Reporter for February 21, 1949, page P180.